United States Patent [19]

Wegmann

[11] 4,186,821

[45] Feb. 5, 1980

[54] LUBRICATING APPARATUS

[75] Inventor: Jerome B. Wegmann, St. Louis County, Mo.

[73] Assignee: McNeill Corporation, Akron, Ohio

[21] Appl. No.: 905,633

[22] Filed: May 15, 1978

[51] Int. Cl.² ............................................. F01M 1/06
[52] U.S. Cl. .................................... 184/7D; 184/7 E
[58] Field of Search .................... 184/7 D, 7 E, 7F; 137/271, 624.14

[56] References Cited

U.S. PATENT DOCUMENTS

| | | | |
|---|---|---|---|
| 3,074,509 | 1/1963 | Robson | 184/7 E |
| 3,298,460 | 1/1967 | Porter et al. | 184/7 D |
| 3,371,745 | 3/1968 | Callahan et al. | 184/7 E |
| 3,409,104 | 11/1968 | Acker et al. | 184/7 E |
| 3,476,214 | 11/1969 | Callahan et al. | 184/7 E |
| 3,653,466 | 4/1972 | Fujita et al. | 184/7 D |
| 3,921,760 | 11/1975 | Brownrigg | 184/7 E |
| 4,105,094 | 8/1978 | Callahan | 184/7 E |

Primary Examiner—David H. Brown
Attorney, Agent, or Firm—Senniger, Powers, Leavitt and Roedel

[57] ABSTRACT

Lubricating apparatus comprising a base and a series of divider valves on the base in which the base comprises an assembly of an inlet end block, intermediate blocks and a head end block, with a divider valve mounted on each of the blocks, and with the blocks drilled to provide passaging for delivery of lubricant under pressure to the valves, passaging for interconnection of the valves, and passaging for delivery of lubricant from the valves.

12 Claims, 18 Drawing Figures

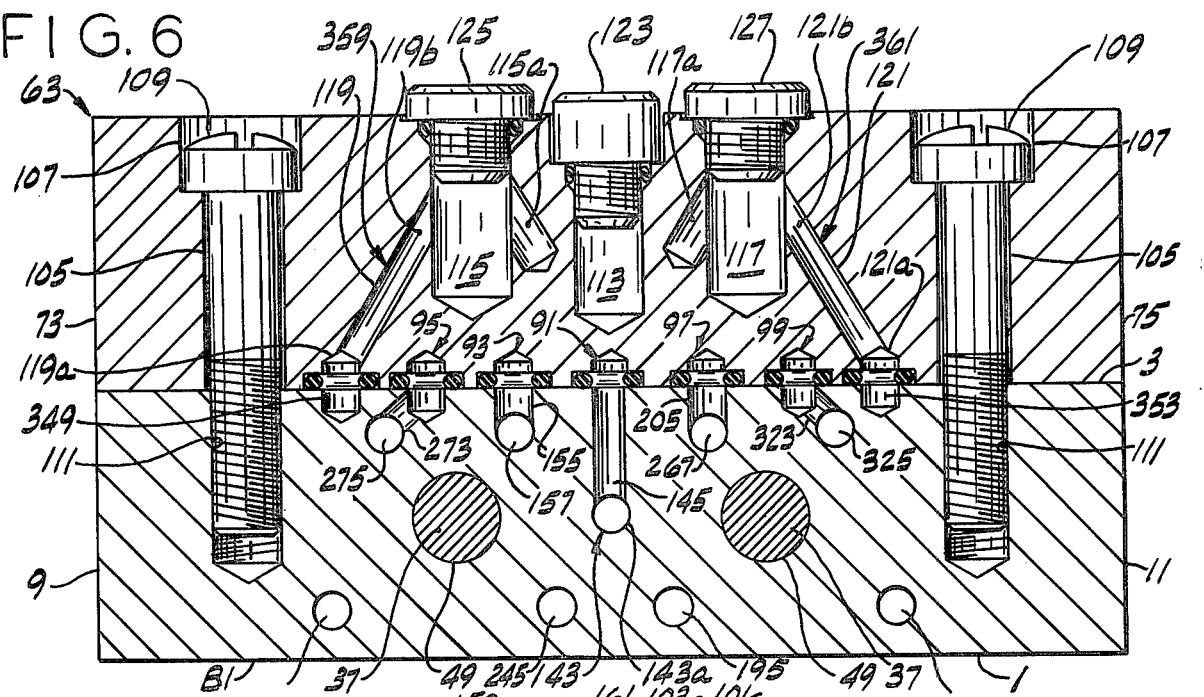
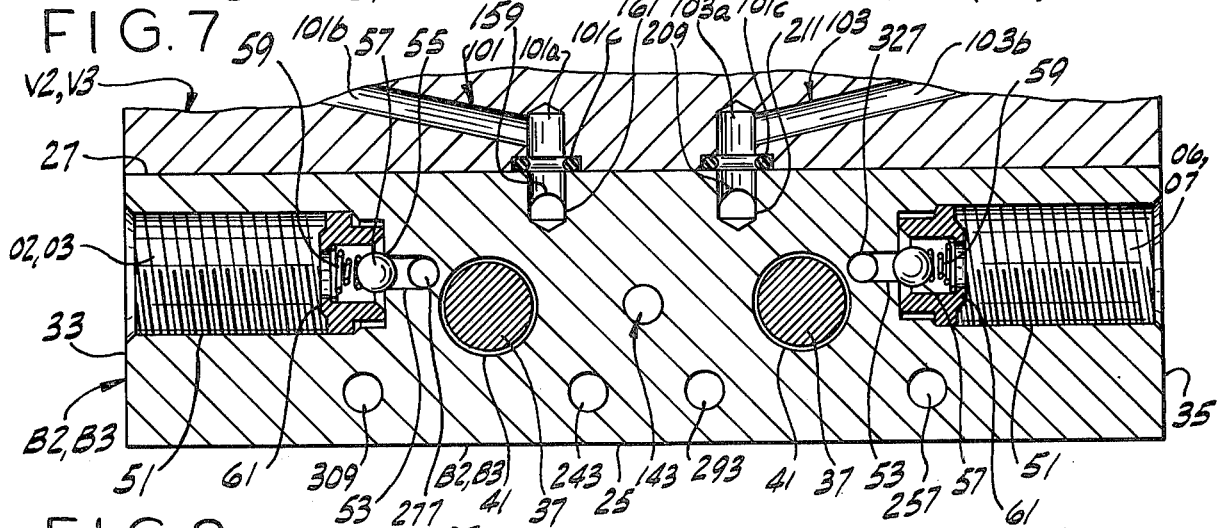
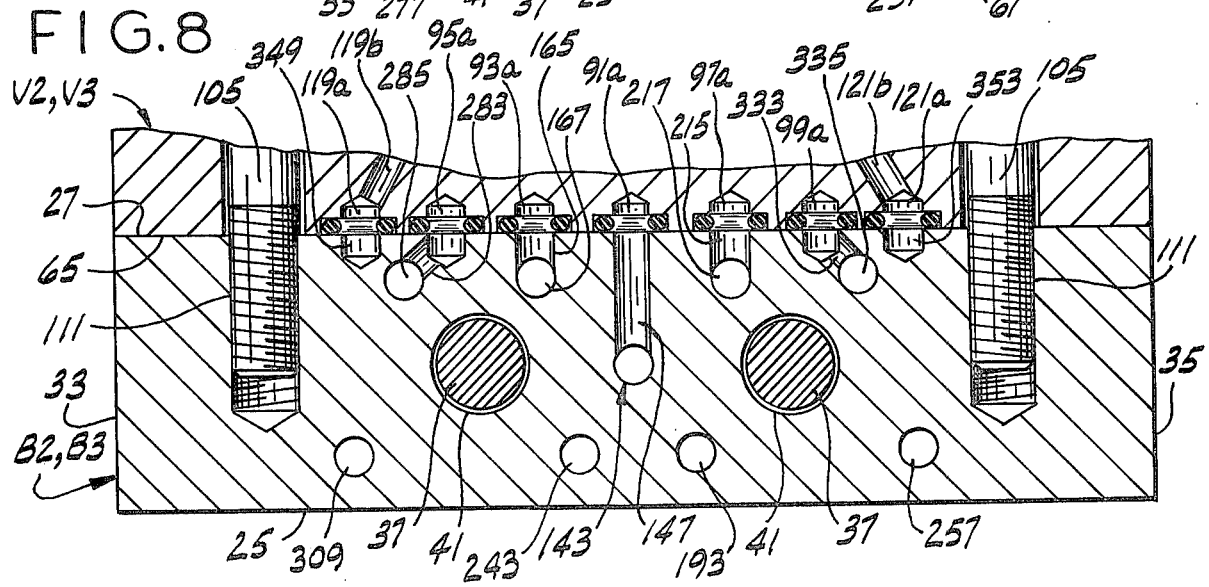

LUBRICATING APPARATUS

BACKGROUND OF THE INVENTION

This invention relates to lubricating apparatus, and more particularly to a so-called divisional lubricant feeder assembly.

The invention involves an improvement on divisional lubricant feeder assemblies of the type shown in U.S. Pat. No. 3,298,460 now owned by the assignee of this invention. This type of assembly comprises a plurality of so-called divider valves, which are lubricant metering valves, removably mounted on a base, the base being formed to provide valve inlet passaging including a manifold for supplying lubricant under pressure from a source to the valves, valve outlet passaging for delivery of metered charges of lubricant from the valves, and valve interconnection passaging for interconnecting the valves for operation of the valves one after another to deliver metered charges of lubricant through the outlet passages in sequence. While such assemblies have been widely used and are satisfactorily operative, they are of such construction that a different base is needed for assemblies of different numbers of divider valves, i.e., bases of different length and with different passaging are needed for mounting different numbers of divider valves. This requires producing and maintaining an inventory of all the different size bases such as may be required. Also, while it is desirable to form passaging in a base by drilling operations, it is difficult accurately and efficiently to drill long holes for the lengths of passaging required at least in the longer bases.

SUMMARY OF THE INVENTION

Accordingly, among the several objects of the invention may be noted the provision of improved lubricating apparatus of the class described enabling utilization of various numbers of divider valve units (e.g., up to nine or more valves) in an assembly with a minimum number of different base units, and more particularly three different base units, as distinguished from requiring base units of different lengths and with different passaging systems for very different number of valves that may be desired in an assembly; and the provision of such lubricating apparatus of such construction as to enable economical production of passaging in the base units by short-hole as distinguished from long-hole drilling (short-hole being of the order of one inch for holes of one-eighth inch diameter, for example).

In general, lubricating apparatus of this invention comprises an assembly of base blocks forming a base, said assembly comprising two base blocks at the ends of the assembly constituting first and second end blocks and at least one base block between the end blocks constituting an intermediate block. Each of the base blocks has a bottom, top, sides and ends. They are assembled with one side of the first end block, constituting its inside face, in face-to-face relation which one side of the adjacent intermediate block and with one side of the second end block, constituting its inside face, in face-to-face relation with one side of the adjacent intermediate block. Each of the base blocks has a lubricant outlet at each of its ends. A series of divider valves is provided, one for each of the base blocks. Each valve comprises a valve block having a bottom, top, sides and ends, a bore extending endwise in the block, a set of passages extending up from the bottom to the bore and in communication with the bore at spaced points along the length of the bore, said set comprising an inlet passage for delivery of lubricant to the bore, transfer passages for interconnection of the valves in the series, and outlet passages for delivery of lubricant from the bore, and a piston member axially slidable in the bore by pressure of lubricant in the bore. The piston members of the valves are successively movable to deliver charges of lubricant through the outlet passages in a sequence via the delivery of lubricant under pressure through the inlet passages to the bores and interconnections between the valves established by the piston members and said transfer passages. The series of divider valves comprises a first and second end valve and at least one intermediate valve each mounted on a respective base block with its bottom in face-to-face relation with the top of the respective base block. The base assembly has passaging for delivery of lubricant to the valve inlet passages comprising an inlet manifold formed by a hole in the first end block extending laterally to its inside face, a registering lateral hole in the intermediate block extending through the intermediate block from one side to the other, and a registering hole extending into the second end block laterally from its inside face, said delivery passaging further comprising holes extending down from the top of the base blocks to the said lateral holes, said downwardly extending holes being in register at their upper ends with the lower ends of the inlet passages in the valve blocks. The base assembly further has passaging for interconnection of the said transfer passages of the valves comprising holes in the end blocks extending laterally to their inside faces, registering holes in the intermediate block extending laterally inward from the sides thereof, and holes extending down from the top of the base blocks to the said lateral holes, said downwardly extending holes having their upper ends in register with the lower ends of the valve interconnection passages in the valve blocks. And the base assembly further has passaging for delivery of lubricant from said outlet passages in the valve blocks to the outlets at the ends of the base blocks comprising holes in the end blocks open at their inside faces, registering holes in the intermediate block open at the sides thereof, and holes extending down from the top of the base blocks having their upper ends in register with the lower ends of the outlet passages in the valve blocks.

Other objects and features will be in part apparent and in part pointed out hereinafter.

BRIEF DESCRIPTION OF THE DRAWINGS

FIG. 6 is a section on line 6—6 of FIGS. 1 and 11 on the scale of FIGS. 3-5;

FIGS. 7, 8, 9 and 10 are views in section on lines 7—7, 8—8, 9—9 and 10—10, respectively, of FIG. 11;

Corresponding reference characters indicate corresponding parts throughout the several view of the drawings.

DESCRIPTION OF THE PREFERRED EMBODIMENT

Figure 1:
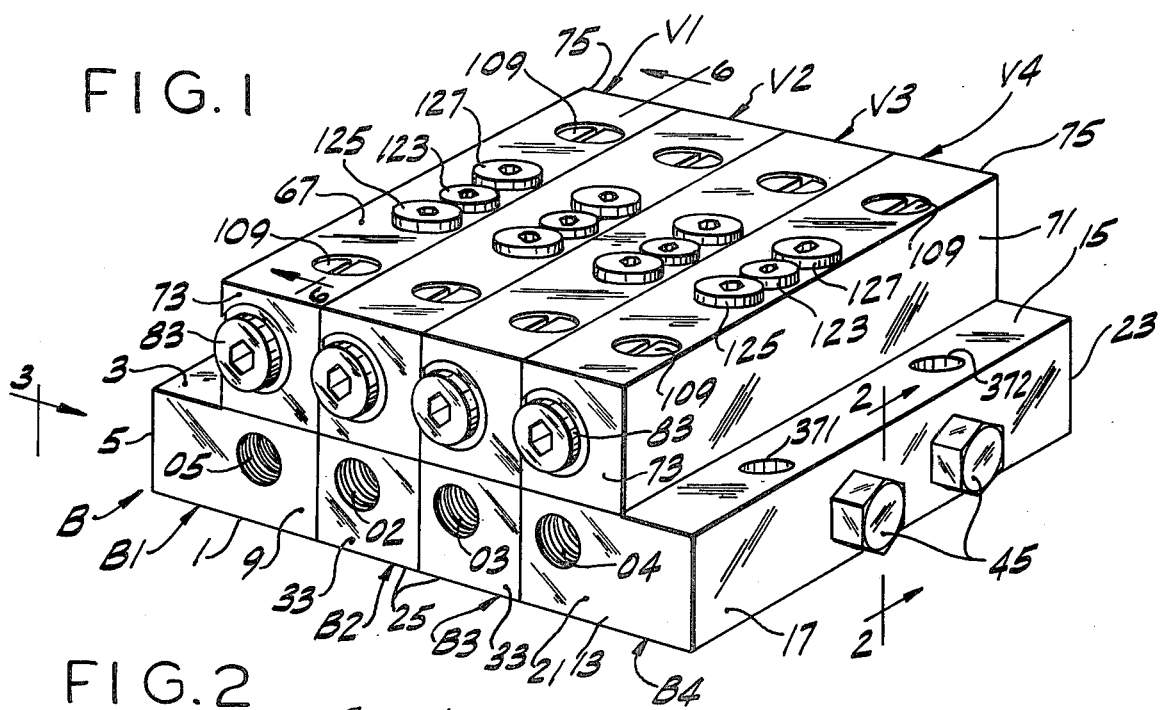
FIG. 1 is a perspective of a divisional lubricant feeder assembly of this invention having four divider valves and a modular base assembly of this invention comprising an inlet end base block, a head end base block and two intermediate base blocks.
Figure 2:
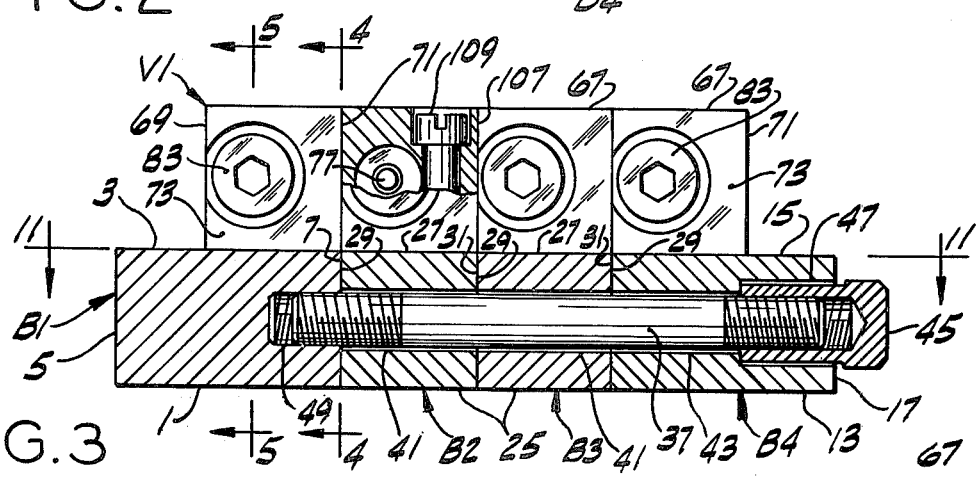
FIG. 2 is a view in elevation of the FIG. 1 assembly as viewed from its end toward the viewer in FIG. 1, with parts of the base assembly broken away and shown in section on line 2—2 of FIG. 1, and a divider valve partly broken away and shown in section.
Figure 18:
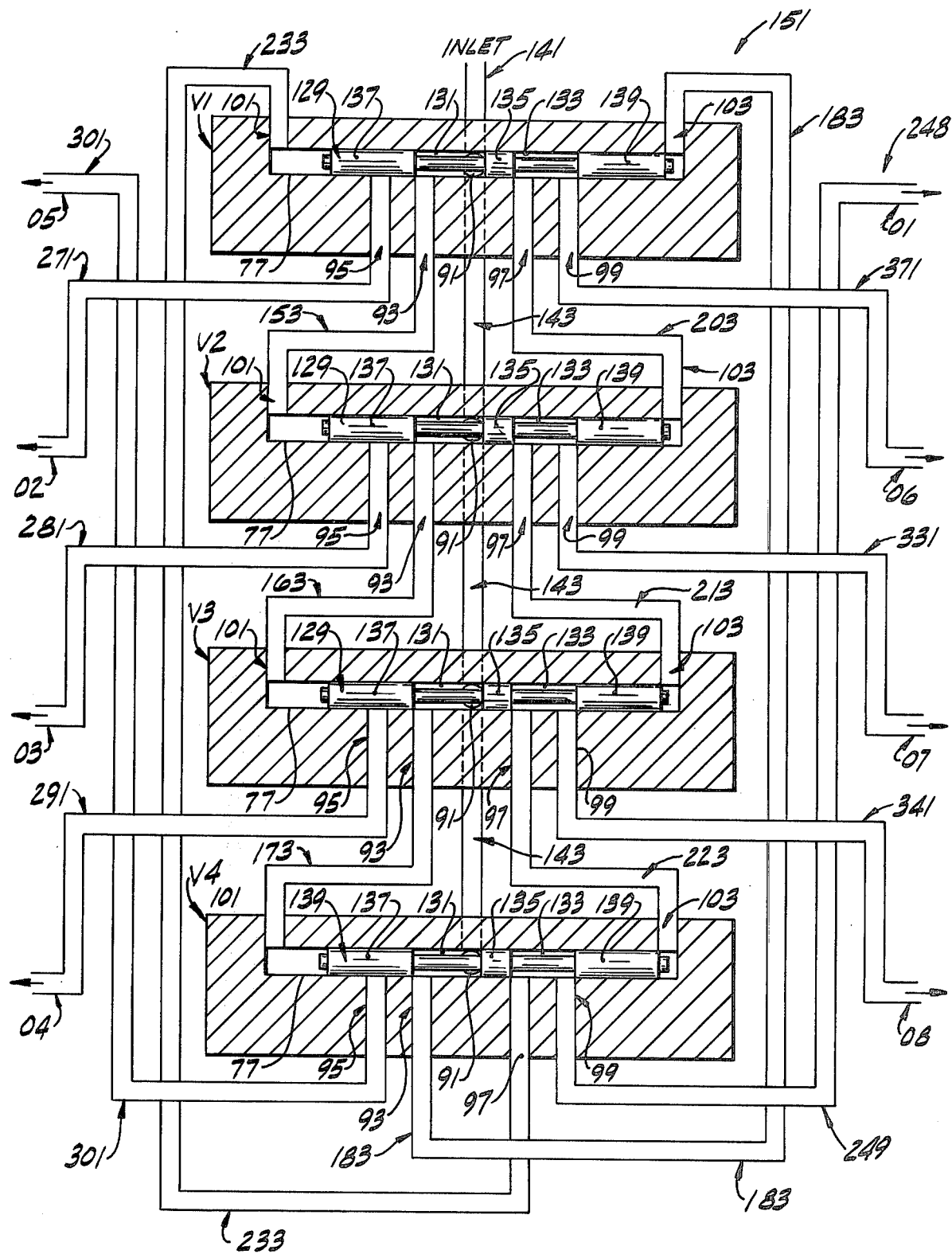
FIG. 18 is a schematic diagram of the passaging of the assembly.

In general, divisional lubricant feeder apparatus of this invention comprises of base blocks forming a base B, said assembly comprising two base blocks at the ends of the assembly constituting first and second end blocks and at least one base block between the end blocks constituting an intermediate block an assembly, and a series of divider valves, one for each of the base blocks, each mounted on a respective base block. As illustrated in FIGS. 1, 2 and 18, the apparatus comprises a series of four divider valves V1-V4 each of which is adapted to deliver charges of lubricant to two points of lubrication, so that the apparatus may serve eight points of lubrication. The valves V1-V4 are identical; each is similar to the divider valve shown in U.S. Pat. No. 3,298,460, issued Jan. 17, 1967, now assigned to the assignee of this application. There being four valves, the base assembly comprises the two end blocks, which are designated B1 and B4, and two intermediate blocks, which are designated B2 and B3. Valves V1-V4 are mounted on base blocks B1-B4, respectively. The end blocks B1 and B4 have certain similarities, but also have certain differences making B1 an inlet end block and making B4 what may be termed a head end block. The intermediate base blocks are identical, the principle of the apparatus being that an assembly may be built up of a desired number of divider valves (from one on up to an upper limit of nine or thereabouts), an inlet end block, a head end block and a number of intermediate base blocks equal to the number of divider valves minus two. Thus, for the four-valve assembly shown, there are two (four minus two) intermediate base blocks.

The inlet end block B1 has a bottom 1, top 3, sides 5 and 7 and ends 9 and 11. The head end block B4 has a bottom 13, top 15, sides 17 and 19 and ends 21 and 23. Each intermediate block B2, B3 has a bottom 25, top 27, sides 29 and 31 and ends 33 and 35. The blocks are assembled with side 7 of block B1, constituting its inside face, in face-to-face relation with side 29 of the first intermediate block B2, with the other side 31 of block B2 in face-to-face relation with side 29 of block B3, and with the other side 31 of block B3 and side 19 of block B4, constituting its inside face, in face-to-face relation. They are held in the stated assembled relation by fastening means (see particularly FIG. 2) extending laterally through the blocks, this fastening means comprising a pair of tie rods each designated 37 extending from one end block (specifically the inlet end block B1) through holes 41 in the intermediate blocks B2 and B3 and registering holes 43 in the head end block B4, and nuts 45 threaded on the outer ends of the rods and received in counterbores 47 at the outer ends of holes 43. The tie rods are threaded at their inner ends in tapped holes 49 in the inlet end block B1. The four base blocks are drawn together into tight engagement by the rods and nuts. They are aligned by means of dowel pins such as indicated at 50 received in holes 50a (see FIG. 15).

Each base block has a lubricant outlet at each of its ends, these outlets being generally designated by the letter O and specifically designated O1-O8. Each of these outlets comprises a tapped hole 51 extending in from the respective end of the block and a smaller hole 53 coaxial with hole 51 extending in from the inner end of hole 51. The outer end of hole 53 is a valve seat 55 for a ball check valve 57 biased inward toward the seat by a spring 59 reacting from a spring abutment 61 threaded in the hole 51. The ball opens outward under pressure of lubricant in hole 53 for discharge of lubricant in hole 51 to a lubricant line (not shown) coupled to hole 51 and connected to a point of lubrication (e.g., a bearing).

Figure 17:
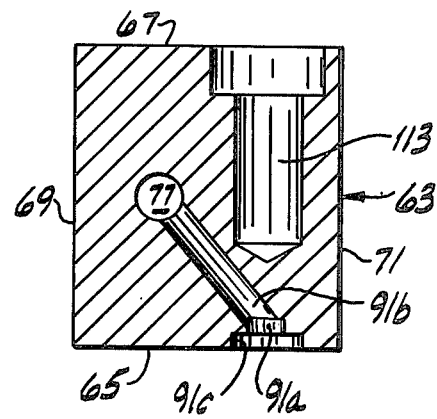
FIG. 17 is a section on line 17—17 of FIG. 16.

Each of divider valves V1-V4 (they are all identical) comprises an elongate valve block 63 of rectangular cross section having a bottom 65, top 67, sides 69 and 71 and ends 73 and 75. A bore 77 (see FIGS. 5, 10 and 16-18) extends endwise in the block, this bore having counterbores 79 and 81 at its ends which are closed by plugs 83 and 85 threaded therein leaving chambers 87 and 89 at the ends of the bore. A set of passages extends up from the bottom of the valve block to the bore in communication with the bore at spaced points along its length, this seat comprising an inlet passage 91 for delivery of lubricant to the bore, and passages 93, 95, 97 and 99, 101 and 103. Each of passages 91, 93, 95, 97 and 99 comprises a short lower end section or port 91a, 93a, 95a, 97a, 99a (see FIG. 8) drilled up into the block from the bottom of the block at right angles to the bottom 65 in a vertical longitudinal plane of the block adjacent side 71 of the block, and thus offset from the bore 77. These ports are counterbored as indicated at 91c etc. for receiving an O-ring seal S. Each of passages 91, 93, 95, 97 and 99 further comprises an angled hole 91b, 93b, 95b, 97b, 99b (see FIG. 17 for 91b; 93b-99b are similar) drilled into the block from the respective port 91a, 93a, 95a, 97a, 99a to the bore 77 in the transverse plane of the respective port. Passages 93 and 95 are located on the side of passage 91 toward end 73 of the block, passages 97 and 99 are located on the opposite side of passage 91 from 93 and 95. Each of passages 101 and 103 has a short lower end section or port 101a, 103a (see FIGS. 5, 7, 10 and 16) drilled up into the block from the bottom of the block at right angles to the bottom in the vertical longitudinal plane of the bore 77, with counterbores c for O-ring seals S, and an angled hole 101b, 103b drilled up into the block from the respective ports 101a, 103a to the end chambers 87 and 89 of the bore 77.

As noted above, passage 91 is an inlet passage for the bore 77. It is in communication at its upper end with the bore generally at the center of length of the bore. Passages 93 and 97 may be referred to as first and second valve interconnection or transfer passages. They are in communication at their upper ends with the bore on opposite sides (i.e., toward left and right) of the inlet passage 91. Passages 101 and 103 may be referred to as third and fourth valve interconnection or transfer passages. They are in communication at their upper ends with opposite ends of bore 77. Passages 95 and 99 may be referred to as first and second outlet passages. They are in communication at their upper ends with the bore between passages 93 and 97 and the respective ends of the bore.

Holes 105 are drilled through the valve block 63 from top to bottom adjacent its ends in the same vertical plane as the ports 91a etc. These are countersunk at the top of the block as indicated at 107. Each valve block 63 is secured on top of its respective base block by screws 109 extending down through the holes 105 threaded at their lower ends in tapped holes 111 in the base block.

A group of three holes 113, 115 and 117 (see FIG. 6) are drilled down in the valve block from the top of the block in the same vertical plane as the ports 91a etc. Hole 113 is the central hole of the group, hole 115 is on the side of hole 113 toward end 73 of the block, and hole 117 is on the opposite side of hole 113. Passages 119 and 121 extend up from the bottom of the block to holes 115 and 117, respectively, passage 119 comprising a short lower end section or port 119a outward of port 95a and an angled hole 119b extending from port 119a to hole 115, passage 121 comprising a port 121a outward of port 99a and an angled passage 121b extending from port 121a to hole 117. Holes 115 and 117 have angled pilot holes 115a and 117a for guiding a drill to drill through to hole 113. Holes 113, 115 and 117 are closed at their upper ends by plugs 123, 125, 127 removably threaded in their upper ends. The holes 113, 115, 117 and passages 119 and 121 provide for what is called "single porting" the apparatus, as will be described.

Figure 5:
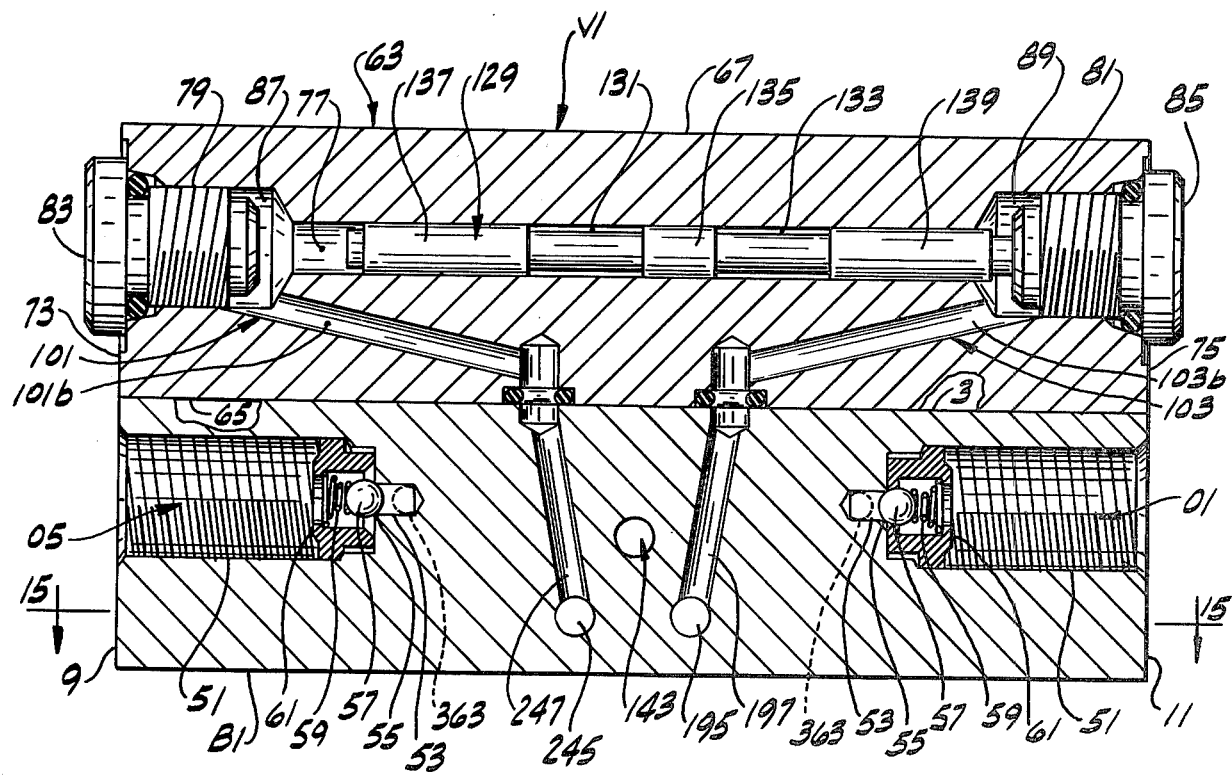
FIG. 5 is a section on line 5—5 of FIG. 2 and FIG. 11, on the scale of FIGS. 3 and 4.
Figure 9:
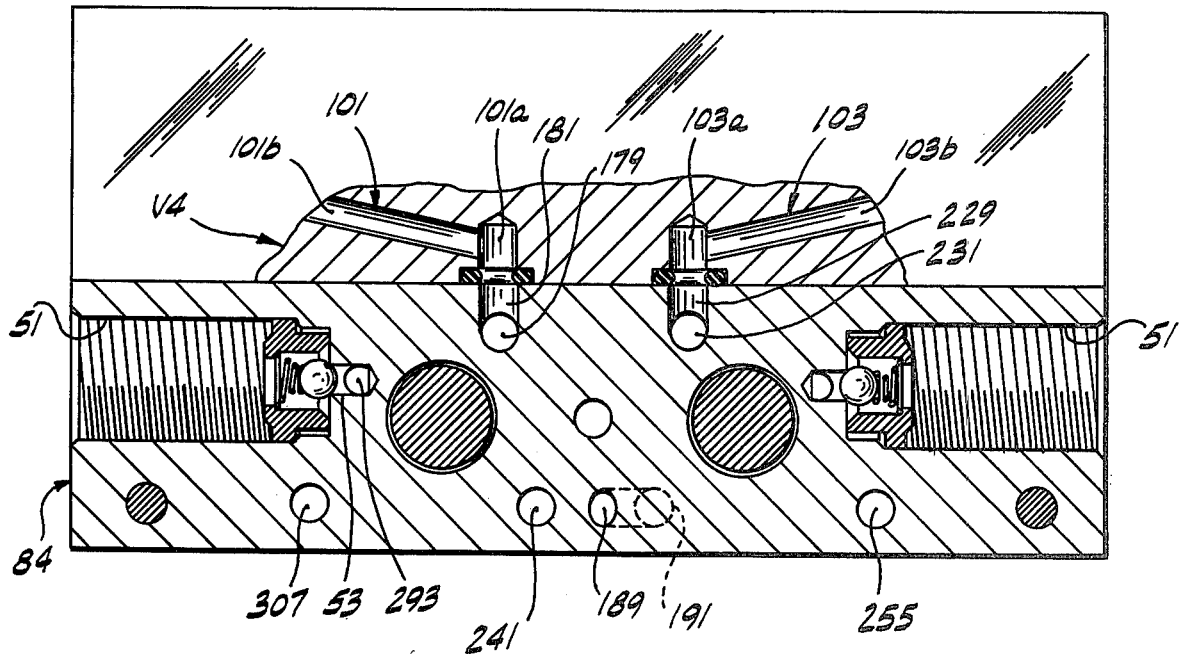
Figure 10:
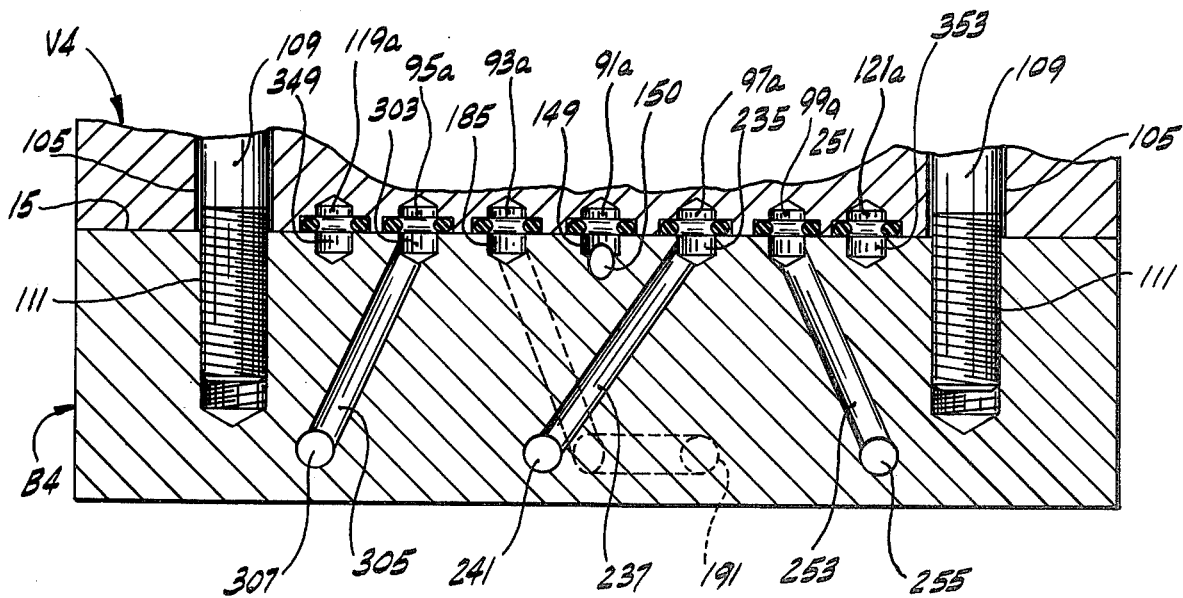

As to each valve V1–V4, a piston member 129 is axially slidable in the bore 77 between a first position toward the right as viewed in FIGS. 5 and 18 determined by engagement of its right end with plug 85 and a second position toward the left as viewed in FIGS. 5 and 18 determined by engagement of its left end with plug 83. The piston member has annular grooves 131 and 133 between a central land 135 and end lands 137 and 139. In its first position, land 137 blocks passage 95, groove 131 interconnects passages 91 and 93 and groove 133 interconnects passages 97 and 99. In its second position, the relationship is reversed, i.e., land 139 blocks passage 99, groove 133 interconnects passages 91 and 97, and groove 131 interconnects passages 93 and 95. The piston member 129 is movable toward the right to its stated first position upon delivery of lubricant under pressure via passage 101 to the left end of the bore 77 and, in moving to its first position, forces a measured amount of lubricant out of the right end of the bore 77 via passage 103. Similarly, but in reverse, the piston member 129 is movable toward the left to its stated second position upon delivery of lubricant under pressure via passage 103 to the right end of the bore 77 and, in moving to its second position, forces a measured amount of lubricant out of the left end of the bore 77 via passage 101.

The base assembly B (end blocks B1 and B4 and intermediate blocks B2 and B3) has passaging designated in its entirety by the reference numeral 141 (see FIGS. 11 and 18) for delivery of lubricant to the inlet passages 91 of the valves V1–V4. This passaging 141 comprises an inlet manifold 143 formed by a hole 143a in the end block B1 extending laterally relative to this block to its inside face 7, registering lateral holes 143b in the intermediate blocks B2 and B3 extending through these blocks from one side thereof to the other, and a registering hole 143c extending into block B4 from its inside face 19. Hole 143a has an enlarged tapped outer end for connection of a lubricant line (not shown) from a source of lubricant under pressure. Passaging 141 further comprises a hole 145 extending down from the top of block B1 to hole 143a therein, holes 147 extending down from the top of blocks B2 and B3 to the holes 143b therein, and a hole 149 extending down from the top of block B4 and a hole 150 drilled at an angle from hole 149 to the hole 143c therein. Hole 145 at its upper end is in register with port 91a of valve V1, holes 147 at their upper ends are in register with ports 91a of valves V2 and V3, and hole 149 at its upper end is in register with port 91a of valve V4.

The base assembly B further has passaging designated in its entirety by the reference numeral 151 (see FIG. 18, and FIGS. 11 and 15) for interconnection of passages 93, 97, 101 and 103 of the valves V1–V4, this valve interconnection passaging comprising the following:

(1) Passaging 153 interconnecting passage 93 of valve V1 and passage 101 of valve V2, this passaging 153 comprising a hole 155 extending down from the top of block B1 in register at its upper end with port 93a of valve V1 to a hole 157 in block B1 extending laterally with respect to block B1 to its inside face 7, a hole 159 in block B2 extending laterally inward from its side 29 in register with hole 157, and a hole 161 in block B2 extending down from the top of block B2 to the hole 159 and in register at its upper end with port 101a of passage 101 in valve V2.

(2) Passaging 163 interconnecting passage 93 of valve V2 and passage 101 of valve V3, this passaging 163 comprising a hole 165 extending down from the top of block B2 in register at its upper end with port 93a of valve V2 to a hole 167 in block B2 extending laterally with respect to block B2 to its side 31, hole 159 in block B3 extending laterally from its side 29 in register with hole 167, and hole 161 in block B3 extending down from its top to the hole 159 and in register at its upper end with port 101a of passage 101 in valve V3.

(3) Passaging 173 interconnecting passage 93 of valve V3 and passage 101 of valve V4 and comprising hole 165 extending down from the top of block B3 in register at its upper end with port 93a of valve V3 to hole 167 in block B3 extending laterally with respect to block B3 to its side 31, a hole 179 in block B4 extending laterally outward from its side 19 in register with hole 167, and a hole 181 in block B4 extending down from its top to the hole 179 and in register at its upper end with port 101a of passage 101 in valve V4.

(4) Passaging 183 (see FIGS. 15 and 18) interconnecting passage 93 of valve V4 and passage 103 of valve V1 and comprising a hole 185 extending down from the top of block B4 in register at its upper end with port 93a of valve V4, a hole 187 angled down from hole 185 to a horizontal hole 189 angled from a horizontal hole 191 extending laterally with respect to block B4 to its inside face 19, holes 193 in blocks B3 and B2 extending through the latter from one side 29 to the other side 31, with the hole 193 in block B2 at its side 29 in register with a hole 195 extending through block B1 from side-to-side and closed at its outer end and a hole 197 in block B1 extending down at an angle from the top of block B1 to the outer end of hole 195 and in register at its upper end with port 103a of passage 103 of valve V1. Hole 195 is closed by a ball 199 backed by a plug 201 threaded in the outer end of the hole. The plug may be backed off for bleeding air from the system.

(5) Passaging 203 interconnecting passage 97 of valve V1 and passage 103 of valve V2 and comprising a hole 205 extending down from the top of block B1 in register at its upper end with port 97a of valve V1 to a hole 207 in block B1 extending laterally with respect to block B1 to its side 7, a hole 209 in block B2 extending laterally inward from its side 29 in register with hole 207, and a hole 211 in block B2 extending down from the top of block B2 to the hole 209 and in register at its upper end with port 103a of passage 103 in valve V2.

(6) Passaging 213 interconnecting passage 97 of valve V2 and passage 103 of valve V3 and comprising a hole 215 extending down from the top of block B2 in register at its upper end with port 97a of valve V2 to a hole 217 in block B2 extending laterally with respect to block B2 to its side 29, hole 209 in block B3 extending laterally from its side 29 in register with hole 217, and hole 211 in block B3 extending down from its top to the hole 209 and in register at its upper end with port 103a of passage 103 in valve V3.

(7) Passaging 223 interconnecting passage 97 of valve V3 and passage 103 of valve V4 and comprising hole 215 extending down from the top of block B3 in register at its upper end with port 97a of valve V3 to hole 217 in block B3 extending laterally with respect to block B3 to its side 31, a hole 229 in block B4 extending laterally outward from its side 19 in register with hole 217, and a hole 231 in block B4 extending down from its top to the hole 229 and in register at its upper end with port 103a of passage 103 in valve V4.

(8) Passaging 233 (see FIGS. 18 and 15) interconnecting passage 97 of valve V4 and passage 101 of valve V1 and comprising a hole 235 extending down from the top of block B4 in register at its upper end with port 97a of valve V4, a hole 237 angled down from hole 235 to a horizontal hole 241 extending laterally with respect to block B4 to its inside face 19, holes 243 in blocks B3 and B2 extending through the latter from one side 29 to the other side 31, with the hole 243 in block B3 at its side 31 in register with hole 241, with holes 243 in blocks B3 and B2 in register, with hole 243 in block B2 at its side 29 in register with a hole 245 extending through block B1 from side-to-side and closed at its outer end by a ball 199 and plug 201, and a hole 247 in block B1 extending down at an angle from the top of block B1 to the outer end of hole 245 and in register at its upper end with port 101a of passage 101 of valve V1.

The base assembly B further has passaging designated in its entirety by the reference numeral 248 (see FIG. 18, and FIGS. 11 and 15) for delivery of lubricant from passages 95 and 99 in the valve blocks, which passages 95 and 99 may be referred to as outlet passages, to the outlets O1–O8 at the ends of the valve blocks, this outlet delivery passaging comprising the following:

(9) Passaging 249 interconnecting passage 99 of valve V4 and outlet O1 in block B1 and comprising a hole 251 extending down from the top 15 of block B4 in register at its upper end with port 99a of valve V4, a hole 253 angled down from hole 251 to a horizontal hole 255 extending laterally with respect to block B4 to its inside face 19, holes 257 in blocks B3 and B2 extending through the latter from one side 29 to the other side 31, with the hole 257 in block B3 at its side 31 in register with hole 255, with holes 257 in blocks B3 and B2 in register, with hole 257 in block B2 at its side 29 in register, with a hole 259 in block B1 extending laterally out from its inside face 7, and a hole 261 in block B1 angled from the hole 259 to the outlet hole 53 of outlet O1 in block B1.

(10) Passaging 271 interconnecting passage 95 of valve V1 and outlet O2 in block B2 comprising a hole 273 angled down from the top of block B1 in register at its upper end with port 95a of valve V1 to a horizontal hole 275 extending laterally with respect to block B1 to its inside face 7, and a horizontal hole 277 in block B2 extending laterally with respect to block B2 from its side 29 to the outlet hole 53 of outlet O2.

(11) Passaging 281 interconnecting passage 95 of valve V2 and outlet O3 in block B3 comprising a hole 283 angled down from the top of block B2 in register at its upper end with port 95a of valve V2 to a horizontal hole 285 in block B2 extending laterally to its side 31 and in register with hole 277 in block B3 extending to hole 53 of outlet O3.

(12) Passaging 291 interconnecting passage 95 of valve V3 and outlet O4 in block B4 comprising hole 283 in block B3 in register at its upper end with port 95a of valve V3, hole 285 in block B3, and hole 293 in block B4 extending laterally outward from side 19 of block B4 to hole 53 of outlet O4.

(13) Passaging 301 (see FIGS. 18 and 15) interconnecting passage 95 of valve V4 and outlet O5 in block B1 comprising a hole 303 extending down from the top of block B4 in register at its upper end with port 95a of valve V4, a hole 305 angled down from hole 303 to a horizontal hole 307 extending laterally with respect to block B4 to its inside face 19, holes 309 in blocks B3 and B2 extending through the latter from one side 29 to the other side 31, with the hole 309 in block B3 at its side 31 in register with hole 307, with holes 309 in register, with hole 309 in block B2 at its side 29 in register with a hole 311 in block B1 extending out from its inside face 7, and a hole 313 in block B1 extending at an angle from hole 311 to the hole 53 of outlet O5.

(14) Passaging 321 interconnecting passage 99 of valve V1 and outlet O6 in block B2 comprising a hole 323 angled down from the top of block B1 in register at its upper end with port 99a of valve V1 to a horizontal hole 325 extending laterally with respect to block B1 to its inside bore 77, and a horizontal hole 327 in block B2 extending from its side 29 to the outlet hole 53 of outlet O6.

(15) Passaging 331 interconnecting passage 99 of valve V2 and outlet O7 in block B3 comprising a hole 333 angled down from the top of block B2 in register at its upper end with port 99a of valve V2 to a horizontal hole 335 in block B2 extending laterally to its side 31, and in register with hole 337 in block B3 extending to outlet O7.

(16) Passaging 341 interconnecting passage 99 of valve V3 and outlet O8 in block B4 comprising hole 333 in block B3 in register at its upper end with port 99a of valve V3, hole 335 in block B3, and hole 347 in block B4 extending laterally outward from side 19 of block B4 to hole 53 of outlet O8.

With regard to the operation of the apparatus, a cycle may be regarded as starting with the piston member 129 of each of the four divider valves V1–V4 in its stated first position toward the right as viewed in FIG. 18. Lubricant is delivered from the inlet manifold 143 via hole 149 in the head end of block B4 (see FIG. 10) to passage 91 of valve V4 (mounted on block B4). It passes via groove 131 of the piston member 129 of valve V4 to passage 93 of valve V4, thence via passaging 183 to passage 103 of valve V1 and the right end (as viewed in FIG. 18) of the bore 77 of valve V1. This drives piston member 129 of valve V1 to the left, forcing a metered charge of lubricant out of the left end of the bore of valve V1 through passaging 233 to passage 97 of valve V4, thence via groove 133 of the piston member of valve V4 to passage 99 of valve V4 and thence via passaging 249 to outlet O1.

With the piston member 129 of valve V1 in its left-hand position, lubricant is delivered from manifold 143 via hole 145 in the inlet end of block B1 (see FIG. 6) to passage 91 of valve V1 (mounted on block B1). It passes via groove 133 of the piston member 129 of valve V1 to passage 97 of valve V1, thence via passaging 203 to passage 103 of valve V2 and the right end of the bore of valve V2. This drives piston member 129 of valve V2 to the left, forcing a metered charge of lubricant out of the left end of the bore of valve V2 through passage 101 of valve V2, passaging 153, passage 93 of valve V1, groove 131 of the piston member (now in its left position) of valve V1, passage 95 of valve V1, and passaging 271 to outlet O2.

With the piston member 129 of valve V2 in its left-hand position, lubricant is delivered from manifold 143 via hole 147 in block B2 (see FIG. 8) to passage 91 of valve V2 (mounted on block B2). It passes via groove 133 of the piston member 129 of valve V2 to passage 97 of valve V2, thence via passaging 213 to passage 103 of valve V3 and the right end of the bore of valve V3. This drives piston member 129 of valve V3 to the left, forcing a metered charge of lubricant out of the left end of the bore of valve V3 through passage 101 of valve V3, passaging 163, passage 93 of valve V2, groove 131 of the piston member (now in its left position) of valve V2, passage 95 of valve V2, and passaging 281 to outlet O3.

With the piston member 129 of valve V3 in its left-hand position, lubricant is delivered from manifold 143 via hole 147 in block B3 (see FIG. 8) to passage 91 of valve V3 (mounted on block B3). It passes via groove 133 of the piston member 129 of valve V3 to passage 97 of valve V3, thence via passaging 223 to passage 103 of valve V4 and the right end of the bore of valve V4. This drives piston member 129 of valve V4 to the left, forcing a metered charge of lubricant out of the left end of the bore of valve V4 through passage 101 of valve V4, passaging 173, passage 93 of valve V3, groove 131 of the piston member (now in its left position) of valve V3, passage 95 of valve V3, and passaging 291 to outlet O4.

With the piston member 129 of valve V4 in its left-hand position, lubricant is delivered from manifold 143 via hole 149 in block B4 (see FIG. 10) to passage 91 of valve V4 (mounted on block B4). It passes via groove 133 of the piston member 129 of valve V4 to passage 97 of valve V4, thence via passaging 233 to passage 101 of valve V1 and the left end of the bore of valve V1. This drives piston member 129 of valve V1 back to the right, forcing a metered charge of lubricant out of the right end of the bore of valve V1 through passage 103 of valve V1, passaging 183, passage 93 of valve V4, groove 131 of the piston member (now in its left position) of valve V4, passage 95 of valve V4, and passaging 301 to outlet O5.

With the piston member 129 of valve V1 back in its right-hand position, lubricant is delivered from manifold 143 via hole 145 in block B1 to passage 91 in valve V1. It passes via groove 131 of the piston member 129 of valve V1 to passage 93 of valve V1, thence via passaging 153 to passage 101 of valve V2 and the left end of the bore of valve V2. This drives piston member 129 of valve V2 back to the right, forcing a metered charge of lubricant out of the right end of the bore of valve V2 through passage 103 of valve V2, passaging 203, passage 97 of valve V1, groove 133 of the piston member (now in its right position) of valve V1, passage 99 of valve V1, and passaging 321 to outlet O6.

With the piston member 129 of valve V2 back in its right-hand position, lubricant is delivered from manifold 143 via hole 147 in block B2 to passage 91 of valve V2. It passes via groove 131 of the piston member 129 of valve V2 to passage 93 of valve V2, thence via passaging 163 to passage 101 of valve V3 and the left end of the bore of valve V3. This drives piston member 129 of valve V3 back to the right, forcing a metered charge of lubricant out of the right end of the bore of valve V3 through passage 103 of valve V3, passaging 213, passage 97 of valve V2, groove 133 of the piston member (now in its right position) of valve V2, passage 99 of valve V2, and passaging 331 to outlet O7.

With the piston member 129 of valve V3 back in its right-hand position, lubricant is delivered from manifold 143 via hole 147 in block B3 to passage 91 of valve V3. It passes via groove 131 of the piston member 129 of valve V3 to passage 93 of valve V3, thence via passaging 173 to passage 101 of valve V4 and the left end of the bore of valve V4. This drives piston member 129 of valve V4 back to the right, forcing a metered charge of lubricant out of the right end of the bore of valve V4 through passage 103 of valve V4, passaging 223, passage 97 of valve V3, groove 133 of the piston member (now in its right position) of valve V3, passage 99 of valve V3, and passaging 341 to outlet O8.

With the return of the piston member 129 of valve V4 to its right-hand position of FIG. 18, the cycle is completed (the cycle involving delivery of the metered charges of lubricant from the outlets O1-O8 one after another) and it is then repeated, the apparatus continuing to cycle until the supply of lubricant under pressure is shut off.

Each of the base blocks B1-B4 has a hole 349 extending down from its top in register at its upper end with port 119a of the respective valve V1-V4, and a hole 351 drilled at an angle from hole 349 to the outlet hole 51 at the respective end of the block. Each of the base blocks B1-B4 also has a hole 353 extending down from its top in register at its upper end with port 121a of the respective valve V1-V4, and a hole 355 drilled at an angle from hole 353 to the outlet hole 51 at the respective end of the block. As to each of the valve and base blocks, holes 349 and 351 in conjunction with passage 119 in the valve block form a passage designated in its entirety by the reference numeral 359 interconnecting the outlet hole 51 at the left end (as viewed in FIG. 6) of the base block with hole 115 in the valve block, and holes 353 and 355 in conjunction with passage 121 in the valve block form a passage designated in its entirety by the reference numeral 361 interconnecting the outlet hole 51 at the right end of the base block with hole 117 in the valve block.

Holes 113, 115 and 117 and passaging 359 and 361 are utilized for "single-porting". For example, by drilling through pilot holes 115a and 117a to hole 113 of valve V1 and by plugging outlet O5 in block B1, lubricant delivered to outlet O5 via passaging 301, instead of exiting via outlet O5, is delivered from O5 through passage 359 in block B1 and valve V1, to hole 115 in valve V1, thence via the drilled-through hole at 115a to hole 113 and drilled-through hole at 117a to hole 117, and passage 361 to outlet O1. The valves may be converted for what is called "cross-porting" by drilling from their ports 119a, 121a to passages 101 and 103.

Figure 3:
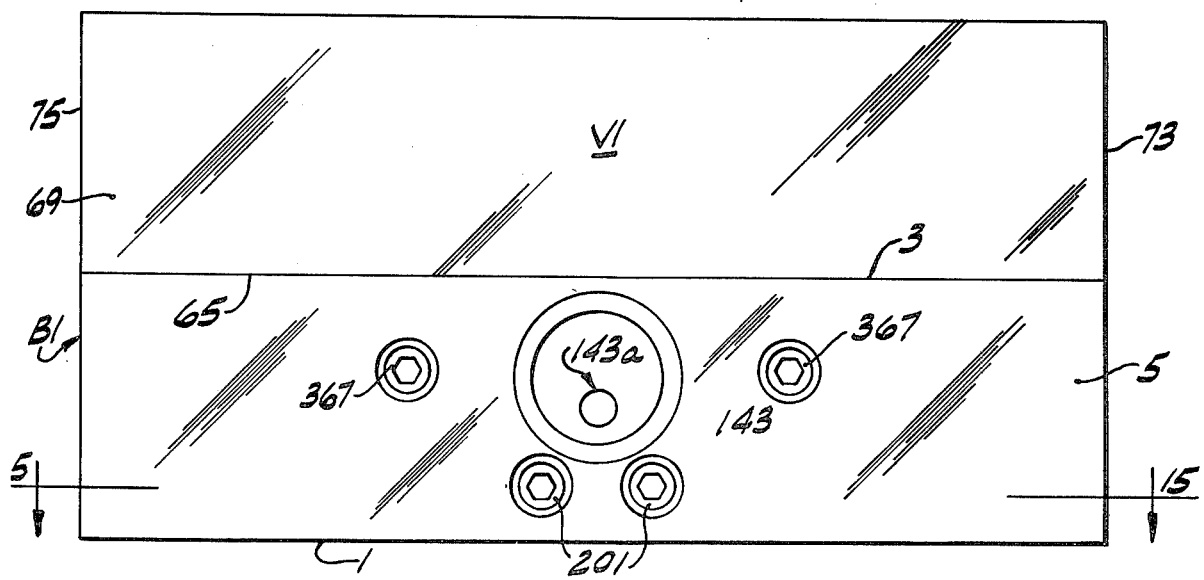
FIG. 3 is a view in elevation of the FIG. 1 assembly as viewed from its left side in FIG. 1, on a larger scale than FIG. 1, showing the outside face of the inlet end block of the base assembly and the outside of the first valve of the series of four divider valves of the overall feeder assembly.
Figure 4:
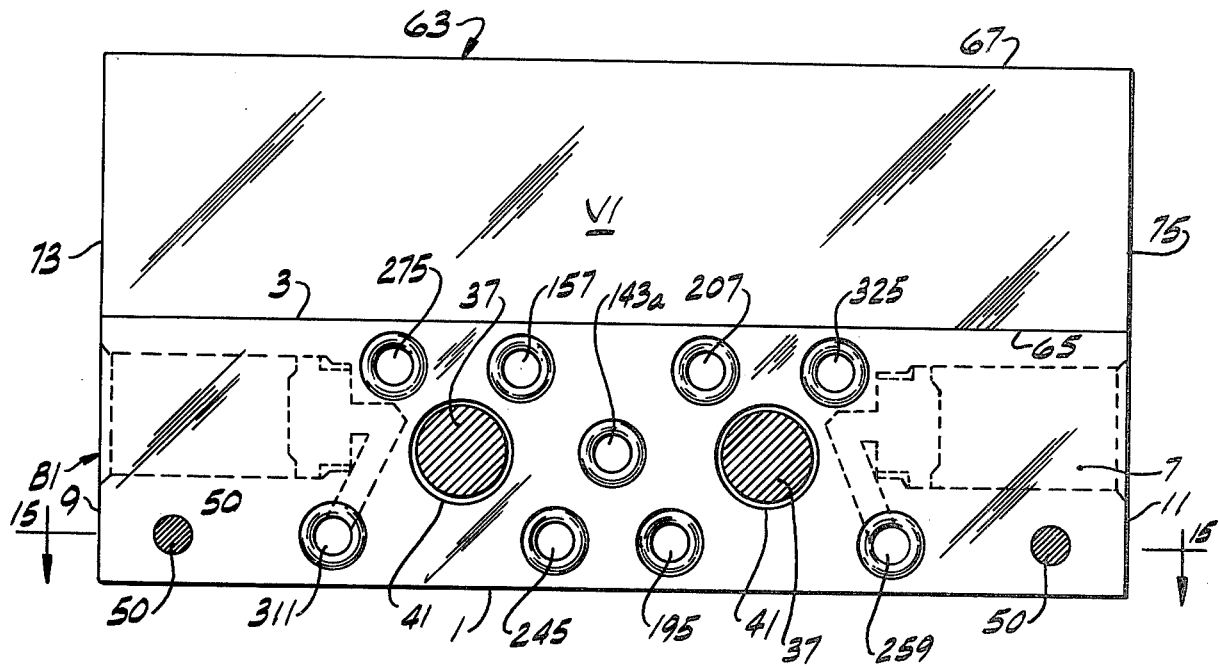
FIG. 4 is a section on line 4—4 of FIG. 2, on the scale of FIG. 3, showing the inside face of the inlet end block and the inside of the first valve.
Figure 11:
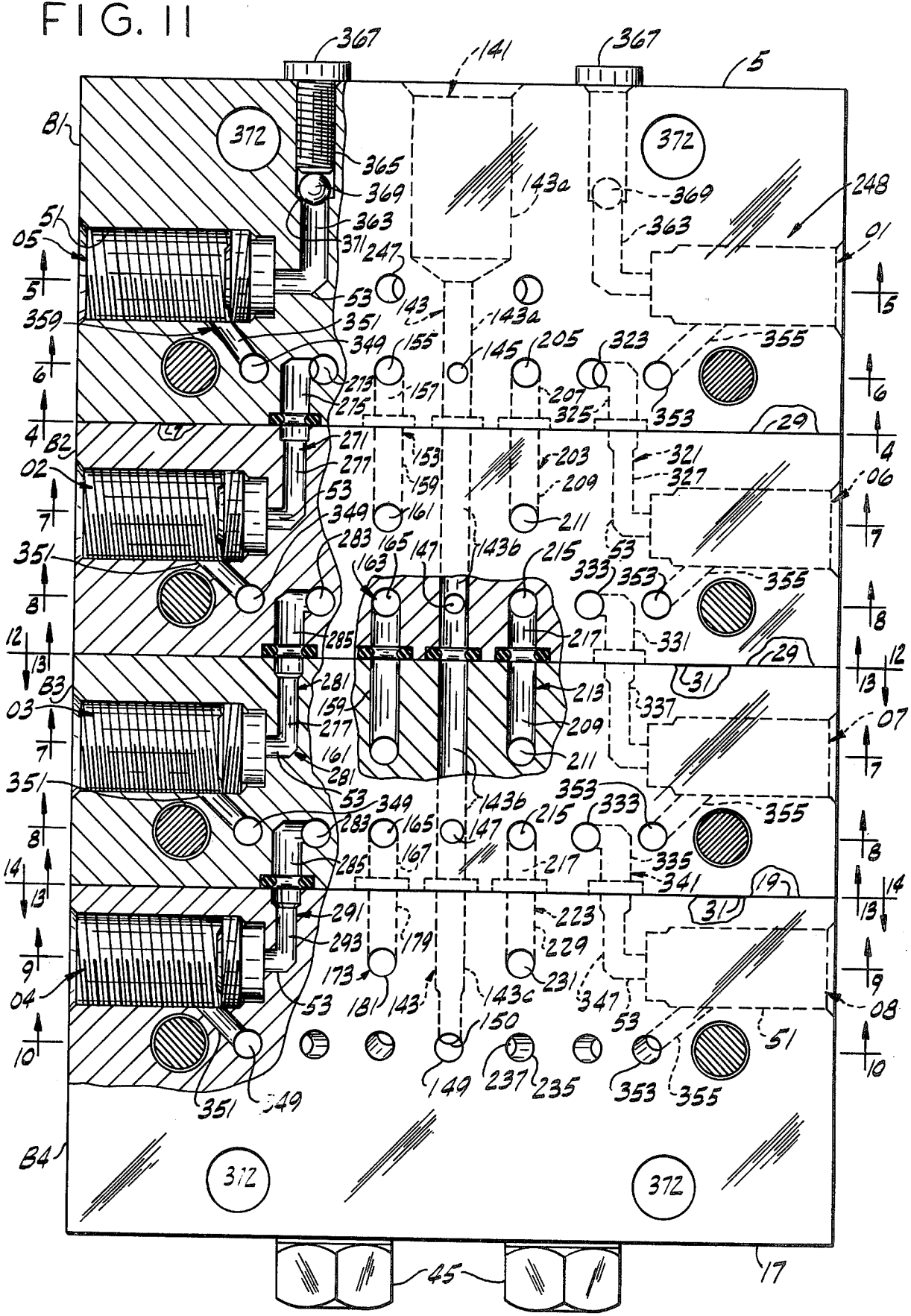
FIG. 11 is a view in section generally on line 11—11 of FIG. 2, on the same scale as FIGS. 7-9, with parts further broken away and shown in section.
Figure 12:
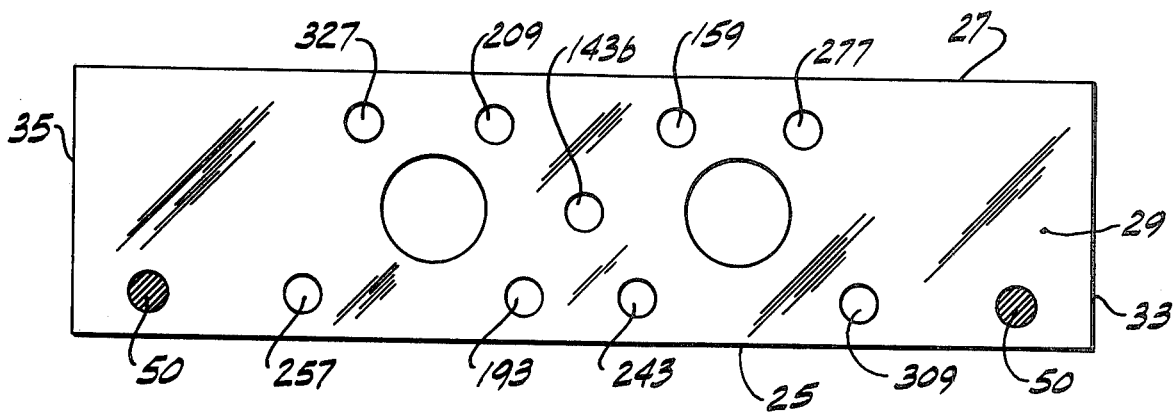
FIGS. 12, 13 and 14 are sections on lines 12—12, 13—13 and 14—14, respectively, of FIG. 11.
Figure 13:
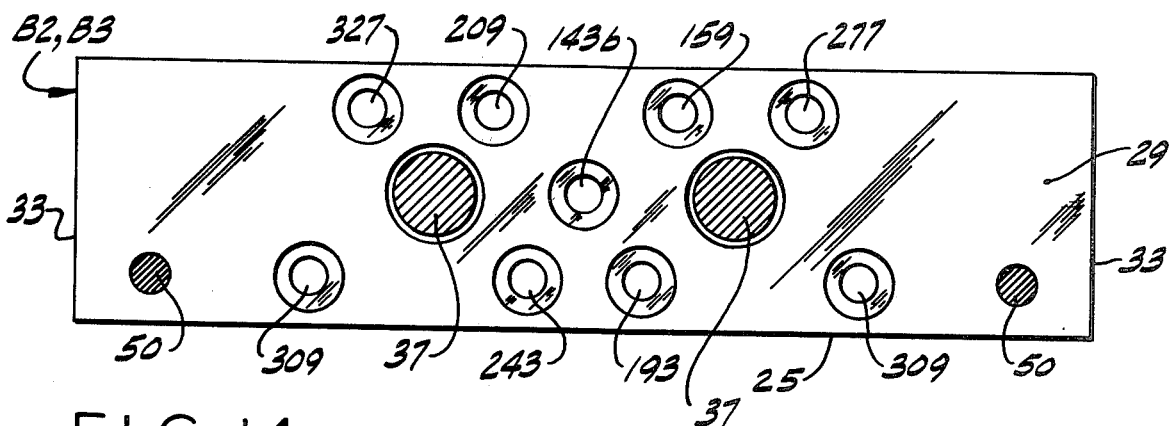
Figure 14:
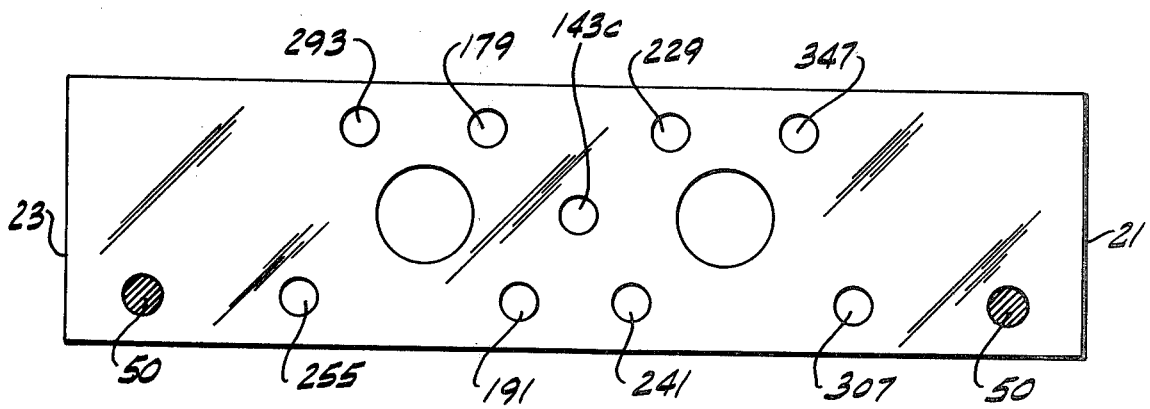
Figure 15:
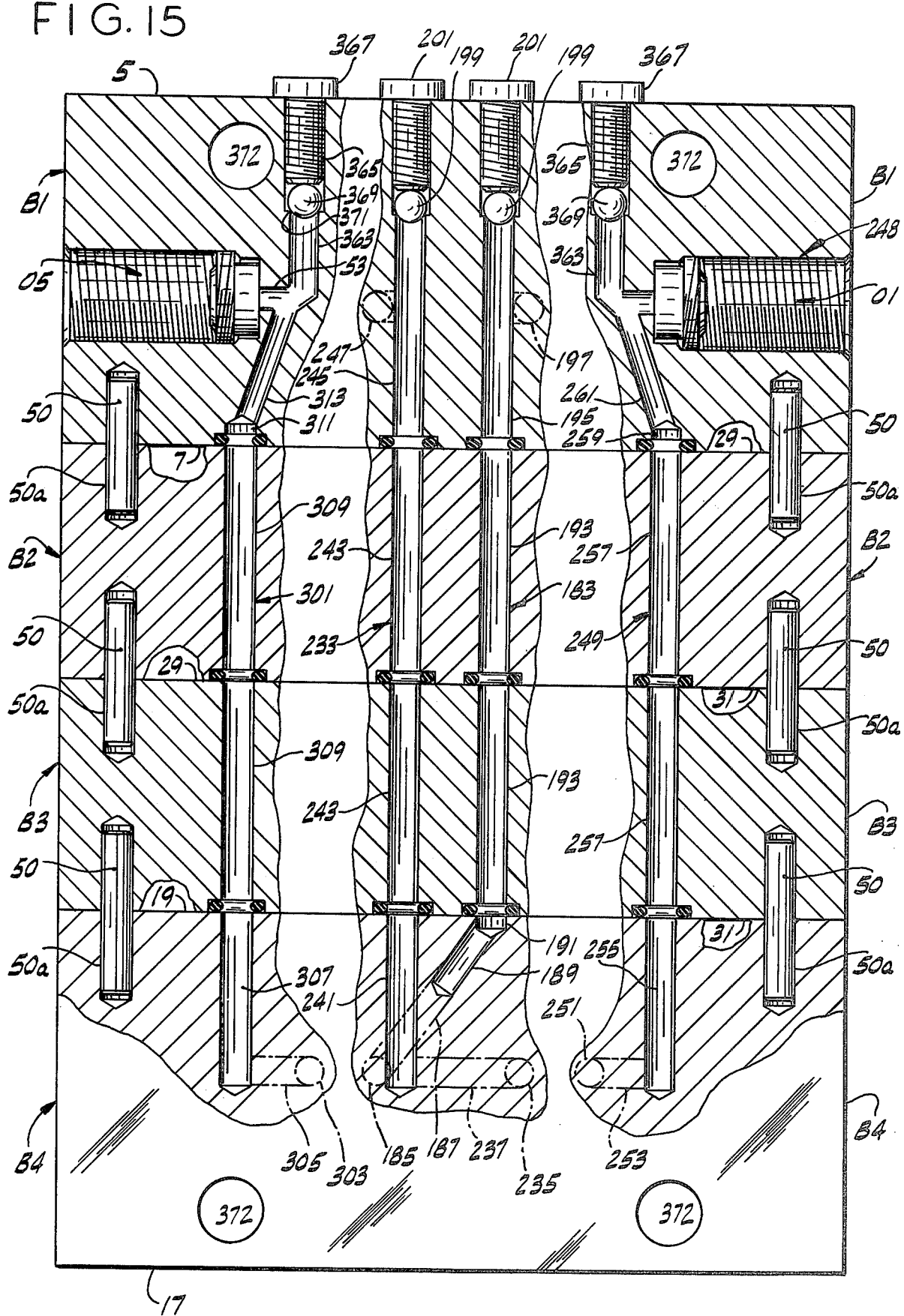
FIG. 15 is a view generally similar to FIG. 11 with parts broken away and in section generally on line 15—15 of FIGS. 3-5.
Figure 16:
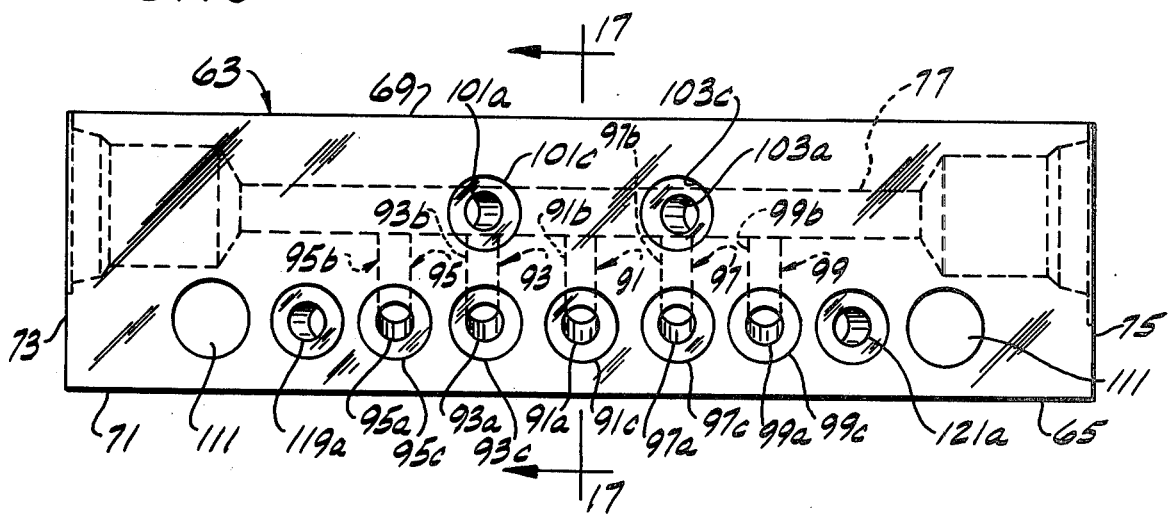
FIG. 16 is a bottom plan of a divider valve.

As appears in FIGS. 3, 11 and 15, holes 363 are drilled in from the outside face 5 of the inlet end block B1 to the outlet holes 53 of the outlets O1 and O5 in block B1. Each of these holes has a tapped counterbore 365 in which is threaded a plug 367 holding a ball 369 against the seat 371 formed by the inner end of the counterbore. These holes 363 are for bleeding air from the system, plugs 367 being backed off to release the balls 369 for this purpose. As appears in FIGS. 1, 11 and 15, the inlet end block B1 and the head end block B4 have holes 372 extending from top to bottom outward of the valves V1 and V4 for receiving fasteners for mounting the assembly on a supporting structure.

From the above, it will be seen that provision of the three different types of modular base units, namely the inlet end base block unit or module B1, the intermediate base block unit or module B2 or B3 (these are identical) and the head end block unit or module B4, in conjunction with a modular divider valve unit (note that valves V1–V4 are all identical) enables assembly of a divisional lubricant feeder with any desired number of valves, generally up to nine as a practical matter, and eliminates the necessity of providing bases of different lengths and different passaging for providing divisional lubricant feeders with different numbers of divider means. (There is no problem in providing tie rods 37 of different lengths for the different length base assemblies.) Not only that, the modular system utilizing the end base blocks and the intermediate base blocks enables accurate and efficient short-hole drilling to form the passaging in the base assembly. In a typical embodiment of the invention, the inlet end blocks B1 and B4 are 3.375 inches long, 1.492 inches wide, and 0.862 inch high, and the intermediate block B2, B3 is 3.375 inches long, 0.892 inch wide, and 0.862 inch high. All the holes in the inlet and base block B1, the head end base block B4, and the intermediate block B2 or B3 forming the passaging in the assembled base B may be formed by drilling, with each hole of relatively small diameter (e.g., one-eighth inch) and formed by drilling no farther into the block than about one inch. While holes 195 and 245 in block B1, for example, may be longer than one inch, they may be formed by drilling in from the opposite side faces 5 and 7 of the block.

The invention enables utilization of stainless steel for the base blocks, as is desirable, where heretofore it was not feasible to make the base for a divisional lubricant feeder of stainless steel due to the difficulty of having relatively long holes efficiently and accurately in stainless steel.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Lubricating apparatus comprising:

an assembly of base blocks forming a base, said assembly comprising two base blocks at the ends of the assembly constituting first and second end blocks and at least one base block between the end blocks constituting an intermediate block each of said base blocks having a bottom, top, sides and ends, said base blocks being assembled with one side of the first end block, constituting its inside face, in face-to-face relation with one side of the adjacent intermediate block and with one side of the second end block, constituting its inside face, in face-to-face relation with one side of the adjacent intermediate block, each of said base blocks having a lubricant outlet at each of its ends;

a series of divider valves, one for each of the base blocks, each comprising a valve block having a bottom, top, sides and ends, a bore extending endwise in the block, a set of passages extending up from the bottom to the bore and in communication with the bore at spaced points along the length of the bore, said set comprising an inlet passage for delivery of lubricant to the bore, transfer passages for interconnection of the valves in the series, and outlet passages for delivery of lubricant from the bore, and a piston member axially slidable in the bore by pressure of lubricant in the bore, the piston members of the valves being successively movable to deliver charges of lubricant through the outlet passages in a sequence via the delivery of lubricant under pressure through the inlet passages to the bores and interconnections between the valves established by the piston members and said transfer passages;

said series of divider valves comprising a first and second end valve and at least one intermediate valve each mounted on a respective base block with its bottom in face-to-face relation with the top of the respective base block;

said assembly of base blocks having passaging for delivery of lubricant to the valve inlet passages comprising an inlet manifold formed by a hole in the first end block extending laterally to its inside face, a registering lateral hole in the intermediate block extending through the intermediate block from one side to the other, and a registering hole extending into the second end block laterally from its inside face, said delivery passaging further comprising:

holes extending down from the top of the base blocks to the said lateral holes, said downwardly extending holes being in register at their upper ends with the lower ends of the inlet passages in the valve blocks;

said assembly of base blocks further having passaging for interconnection of the said transfer passages of the valves comprising holes in the end blocks extending laterally to their inside faces, registering holes in the intermediate block extending laterally inward from the sides thereof, and holes extending down from the top of the base blocks to the said lateral holes, said downwardly extending holes having their upper ends in register with the lower ends of the transfer passages in the valve blocks;

and said assembly of base blocks further having passaging for delivery for lubricant from said outlet passages in the valve blocks to the outlets at the ends of the base blocks comprising holes in the end blocks open at their inside faces, registering holes in the intermediate block open at the sides thereof, and holes extending down from the top of the base blocks having their upper ends in register with the lower ends of the outlet passages in the valve blocks.

2. Lubricating apparatus as set forth in claim 1 wherein the base blocks are secured together in side-by-side assembled relation by fastening means extending laterally therethrough.

3. Lubricating apparatus as set forth in claim 2 wherein each valve block is secured on the respective base block by fastening means extending down through the valve block into the base block.

4. Lubricating apparatus as set forth in claim 2 wherein the base blocks have interengageable means for alignment therewith with lateral holes in the base blocks in register.

5. Lubricating apparatus as set forth in claim 2 wherein said fastening means comprises tie rods extending through lateral holes in the blocks.

6. Lubricating apparatus as set forth in claim 5 wherein the tie rods are secured at one end in holes in one end block and extend through holes in the intermediate block and the other end block, and have nuts threaded on their other ends.

7. Lubricating apparatus as set forth in claim 1 wherein the inlet passage of each valve is in communication with the bore of the valve generally centrally of the length of the bore, and each valve has first and second transfer passages in communication with the bore on opposite sides of the inlet passage, third and fourth transfer passages in communication with opposite ends of the bore, and first and second outlet passages in communication with the bore between the first and second transfer passages and the ends of the bore, said piston member being movable between a first position toward one end of the bore wherein it blocks the first outlet passage and interconnects the inlet passage and the first transfer passage and interconnects the second transfer passage and the second outlet passage and a second position wherein it blocks the second outlet passage and interconnects the inlet passage and the second transfer passage and interconnects the first transfer passage and the first outlet passage, and wherein the holes in the base blocks provide (a) passages interconnecting the first and second transfer passages of each valve from the valve on the first end block to the valve on the second end block with the third and fourth transfer passages of the next valve in the series, (b) passages interconnecting the first and second outlet passages of each valve from the valve on the first end block to the valve on the second end block with the outlets of the next base block, (c) passages interconnecting the first and second transfer passages of the valve on the second end block with the third and fourth passages of the valve on the first end block, and (d) passages interconnecting the outlet passages of the valve on the second end block with the outlets of the first end block.

8. Lubricating apparatus as set forth in claim 7 wherein the lower ends of the first and second transfer passages and the first and second outlet passages of each valve are generally in a first longitudinal plane of the valve block toward one side of the block and the lower ends of the third and fourth transfer passages of each valve are generally in a second longitudinal plane of the valve block between said first plane and the other side of the valve block, wherein the valves are connected on the base blocks with the said one side of each valve block toward the said other side of the next valve block in the series, the holes extending down from the top of the base blocks having their upper ends in two corresponding planes for registering with the lower ends of the passages in the valves.

9. Lubricating apparatus as set forth in claim 7 wherein each of passages (a) extends down from the top of a base block, through the block to its side engaging the respective side of the next base block, through the next base block from its said respective side, and thence up to the top of the next base block.

10. Lubricating apparatus as set forth in claim 9 wherein each of passages (b) extends down from the top of a base block, through the base block to its side engaging the respective side of the next base block, and through the next base block from its said respective side to the respective outlet.

11. Lubricating apparatus as set forth in claim 7 wherein the passages (c) and (d) are formed in part by holes extending through the intermediate block from one side thereof to the other.

12. Lubricating apparatus as set forth in claim 11 wherein passages (c) and (d) are formed in part by holes in the first and second end blocks extending laterally from their inside faces.

* * * * *